(12) United States Patent
Kim et al.

(10) Patent No.: US 6,685,329 B2
(45) Date of Patent: Feb. 3, 2004

(54) BRIGHTNESS-ENHANCING LIGHT GUIDING PLATE AND LIQUID CRYSTAL DISPLAY DEVICE USING THE SAME

(75) Inventors: Hee-Sun Kim, Suwon-si (KR); Dong-Sun Kim, Cheonan-si (KR); Young-Duk Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/116,546

(22) Filed: Apr. 3, 2002

(65) Prior Publication Data
US 2003/0048627 A1 Mar. 13, 2003

(30) Foreign Application Priority Data
Sep. 7, 2001 (KR) .......................................... 2001-55148

(51) Int. Cl.$^7$ ................................................. F21V 7/04
(52) U.S. Cl. ............................. 362/31; 362/26; 385/146
(58) Field of Search ............................... 362/26, 27, 31; 385/146

(56) References Cited

U.S. PATENT DOCUMENTS

2001/0020984 A1 * 9/2001 Umemoto ..................... 362/31

* cited by examiner

*Primary Examiner*—Stephen Husar
(74) *Attorney, Agent, or Firm*—Cantor Colburn LLP (57) ABSTRACT

Disclosed are a brightness-enhancing light guiding plate and an LCD using the same, in which a brightness enhancing recess portion for improving an optical distribution, changing a light path and enhancing brightness is formed at a surface by which light is reflected. The brightness enhancing recess portion has a reflection recess surface having a maximum surface area and a non-reflection recess surface having a minimum surface area, thereby improving the brightness, changing the light path and improving the optical distribution and thus improving a displaying performance.

20 Claims, 8 Drawing Sheets

BRIGHTNESS-ENHANCING LIGHT GUIDING PLATE AND LIQUID CRYSTAL DISPLAY DEVICE USING THE SAME

BACKGROUND OF THE INVENTION

1. Field of the Invention

The present invention relates to a liquid crystal display device (LCD), and more particularly, to a brightness-enhancing light guiding plate, which changes an optical distribution concentrated on a limited surface area into a uniform optical distribution on an enlarged surface area and thus enhances a brightness necessary for displaying an image, thereby improving a displaying performance, and an LCD device using the same.

2. Description of the Related Art

Generally, an LCD can be defined as one of display devices for displaying an image using an electro-optical property of liquid crystal having a physical property between crystal and liquid.

Herein, the electro-optical property of the liquid crystal is meant by that, when an electric field is applied to the liquid crystal, an alignment of liquid crystal molecules is changed and thus an amount of light passing through the liquid crystal is changed.

The liquid crystal having the aforementioned property, however, cannot generate light by itself. Thus, in order to perform a displaying operation in the LCD, the liquid crystal should be precisely controlled in a minute surface area unit and light capable of passing through the liquid crystal should be available.

The precise control of the liquid crystal is realized by a thin film transistor fabricated in a very small size by a semiconductor device fabricating process, and a transparent electrode having a high transparency for light transmission and a desired conductivity.

Further, light can be provided to the LCD by a backlight assembly. Since the displaying operation in the LCD is generally performed in a plane form, the backlight assembly has to generate an artificial light having a uniform optical distribution in the plane shape.

Compared with the sunlight, the artificial light source is, however, in the form of a point light source or a linear light source. The point light source and the linear light source have a problem in that brightness thereof is abruptly changed depending on a change in a distance from the light sources.

Therefore, it is very difficult to directly apply the point light source or the linear light source to the LCD without carrying out a separate light processing operation.

Recently, in order to overcome the foregoing problem, there has been developed a technology for changing the point light source or the linear light source into the plane light source. A light guiding plate (LGP) is used for changing the point light source or the linear light source into the plane light source.

As an example, the LGP may have a rectangular parallelepiped shape. A light is incident into a side surface of the LGP. The incident light is reflected by a bottom surface of the LGP and widely spread, to be outputted from the LGP. In other words, the LGP functions to improve the optical distribution, and at the same time, to change a direction of the light. In order to enhance the reflection efficiency, reflection dots including a reflective material with a superior reflectivity are formed on the bottom surface of the LGP.

The reflection dots are generally formed by a silkscreen method or the like. If the reflection dot does not have a desirable shape, the light reflection efficiency may be lowered. Further, it is difficult to form the reflection dots in a critical size or less by the silkscreen method.

Therefore, a light guiding plate without the reflection dots is needed for the purpose of high brightness displaying operation.

SUMMARY OF THE INVENTION

The present invention provides a brightness-enhancing light guiding plate capable of increasing efficiency in using a light generated from a light source and thereby capable of carrying out a high brightness displaying operation.

Further, the present invention provides an LCD using the brightness-enhancing light guiding plate capable of increasing the efficiency in using the light generated from the light source and thereby capable of carrying out the high brightness displaying operation.

In one aspect, there is provided a brightness-enhancing light guiding plate. In the brightness-enhancing light guiding plate, a light is incident through a light incident surface. A bottom surface is arranged adjacent to the light incident surface, and reflects the light. A light output surface faces the bottom surface. The light is outputted through the light output surface. A brightness-enhancing recess portion has a reflection recess surface which faces the light incident surface with a first inclination with respect to the bottom surface and reflects the light toward the light output surface, and a non-reflection recess surface which is extended from an end of the reflection recess surface with a second inclination with respect to the bottom surface. The second inclination of the non-reflection recess surface is greater than the first inclination of the reflection recess surface.

In another aspect, there is provided a liquid crystal display. The liquid crystal display includes a backlight assembly. The back light assembly includes a brightness-enhancing light guiding plate. In the brightness-enhancing light guiding plate, a light is incident through a light incident surface. A bottom surface is arranged adjacent to the light incident surface, and reflects the light. A light output surface faces the bottom surface. The light is output through the light output surface. A brightness-enhancing recess portion has a reflection recess surface which faces the light incident surface with a first inclination with respect to the bottom surface and reflects the light toward the light output surface, and a non-reflection recess surface which is extended from an end of the reflection recess surface with a second inclination with respect to the bottom surface. The second inclination of the non-reflection recess surface is greater than the first inclination of the reflection recess surface. The backlight assembly also includes an optical distribution changing part for making uniform an optical distribution of the light outputted from the brightness-enhancing light guiding plate. An LCD panel assembly precisely controls light amount of the light generated from the backlight assembly to display an image.

BRIEF DESCRIPTION OF THE DRAWINGS

The above and other advantages of the present invention will become more apparent by describing in detail preferred embodiments thereof with reference to the attached drawings in which.

DESCRIPTION OF THE PREFERRED EMBODIMENTS

Now, preferred embodiments of the present invention will be described in detail with reference to the drawings.

Figure 1:
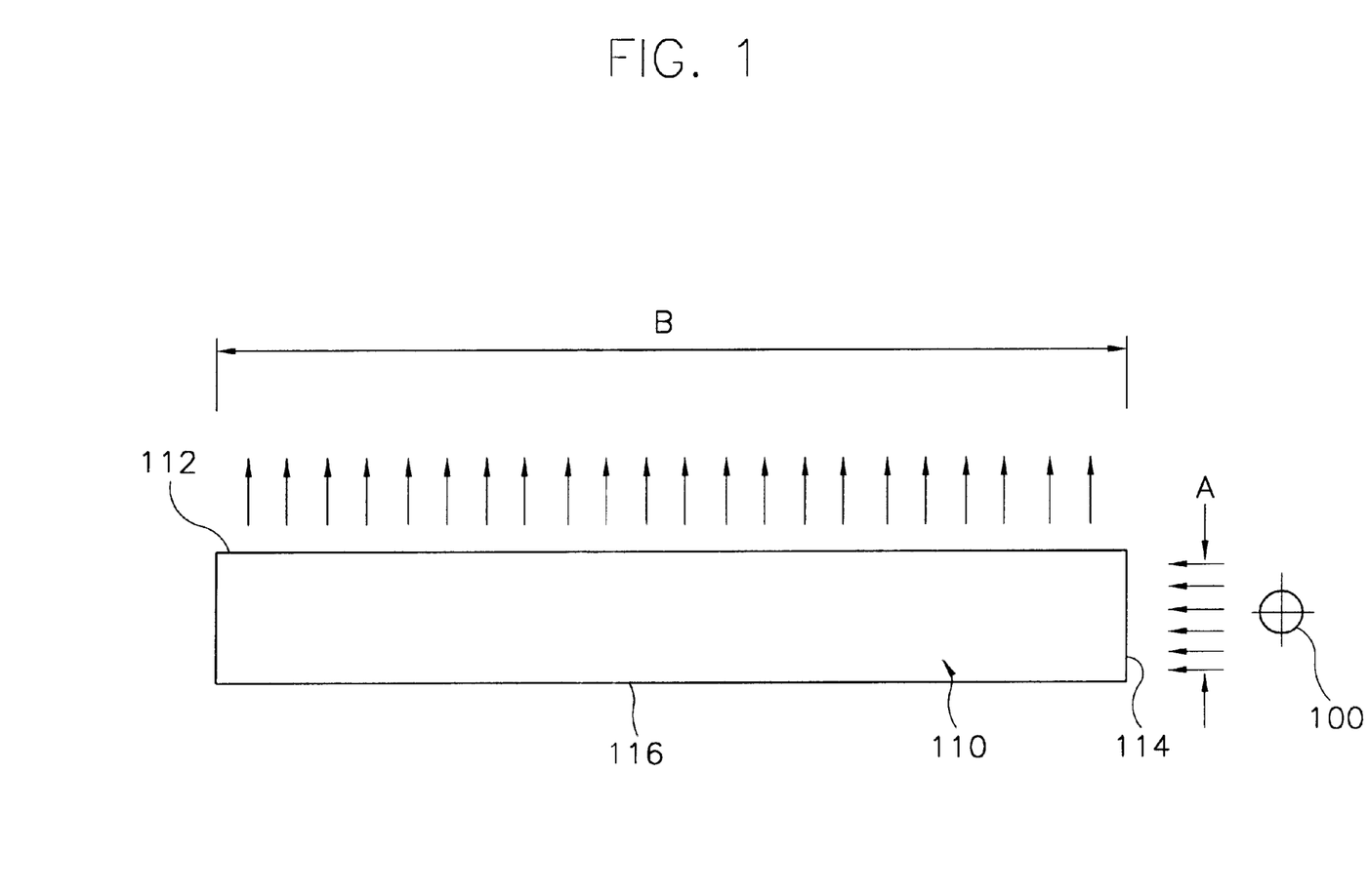
FIG. 1 is a schematic view showing a principle of changing an optical distribution through a brightness-enhancing light guiding plate according to one embodiment of the present invention.

Referring to FIG. 1, an expression "light guiding plate 110" which is generally used throughout the specification is defined as an optical distribution changing unit by which an optical distribution concentrated on a limited surface area "A" is changed into an uniform optical distribution throughout an enlarged surface area "B".

Figure 2:
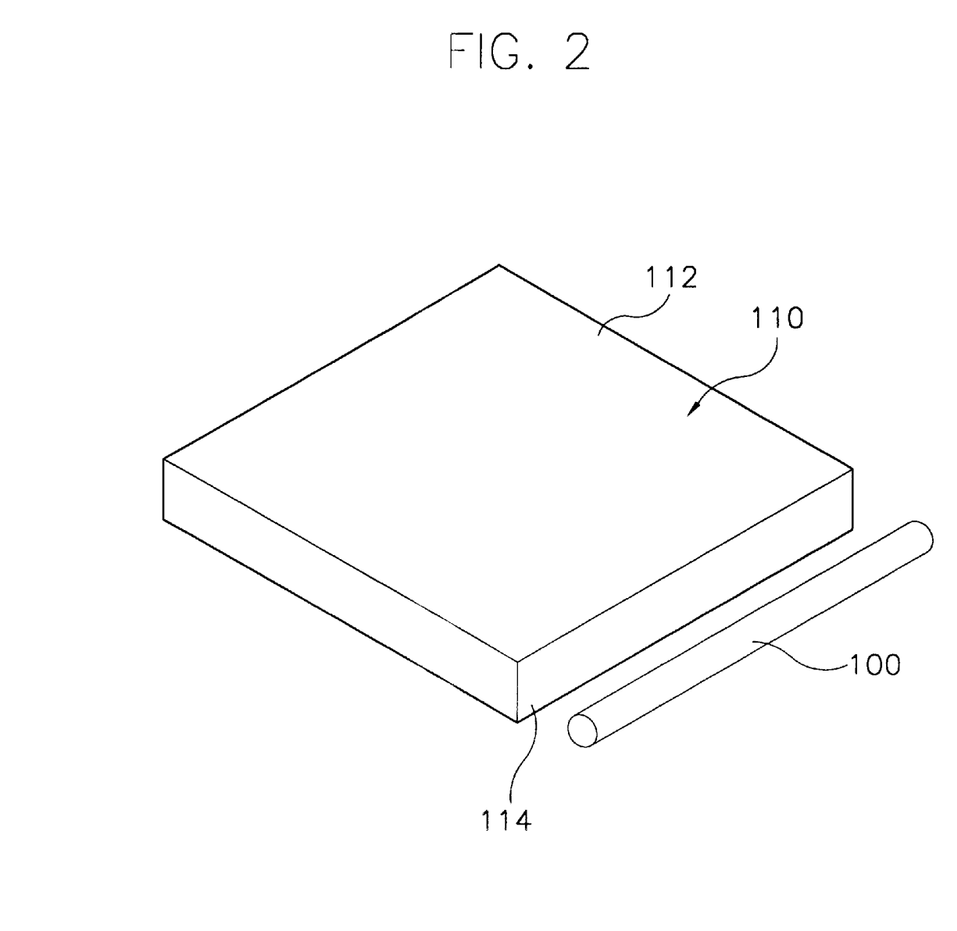
FIG. 2 is a schematic view showing the brightness-enhancing light guiding plate and a lamp according to one embodiment of the present invention.

As shown in FIG. 2, the light guiding plate 110 has a rectangular parallelepiped shape, as one example. More specifically, the light guiding plate 110 has the rectangular parallelepiped shape having four side surfaces, an upper surface and a lower surface.

Referring to FIGS. 1 and 2, in the light guiding plate 110 as mentioned above, a light from a lamp 100 is supplied through one of the four side surfaces. An optical distribution and an optical path of the supplied light are changed in one of the upper surface and the lower surface. The light of which the optical distribution and the optical path are changed is output through the remaining surface.

Hereinafter, one of the four side surfaces of the light guiding plate 110, through which the light is supplied, is defined as a light incident surface 114. Another side surface, by which the optical distribution and the optical path of the light supplied from the light incident surface 114 are changed, is defined as a light reflection surface 116 (refer to FIG. 1). Yet another surface, through which the light is output, is defined as a light output surface 112.

Performance of the light guiding plate 110, as described above, is decided according to brightness uniformity and brightness intensity of the light output through the light output surface 112.

Various methods can be used to improve and increase the brightness uniformity and the brightness intensity of the light, which have an influence upon the performance of the light guiding plate 110. Among them, the present embodiment uses a method of changing the shape of the light reflection surface 116 in the light guiding plate 110.

Specifically, in order to improve and increase the brightness uniformity and the brightness intensity of the light, a recess portion (having a plurality of recesses) is formed at a surface of the light reflection surface 116 of the light guiding plate 110.

The recess portion may have a dot shape or a groove shape. However, it should be noted that forming the recess portion on the light reflection surface 116 does not always provide the brightness enhancing effect. That is, if the shape of the recess portion is unsuitable, the brightness of the light outputted from the light output surface is much lower than that of the light generated from a light source.

This means that the shape of the recess portion formed at the light reflection surface 116 has a great influence on the brightness distribution and the brightness intensity. Further, this means that the brightness can be remarkably improved if the shape of the recess portion is optimized.

Hereinafter, there is described a process of improving the brightness in the light guiding plate followed by the formation of a suitable shape of the recess portion.

Generally, in order to improve the brightness, the recess portion may have a circular cone shape or a symmetrical polypyramid shape which is formed from a surface of the light reflection surface 116 toward an inside portion. The recess portion having the polypyramid shape is formed with three or more side surfaces.

The brightness may be more or less influenced by the simple and typical recess portion, as described above. However, it is still insufficient to obtain a maximum brightness. This is because the light is reflected from only a portion of an entire surface area of the recess portion formed in the light reflection surface 116.

In other words, in case the recess portion formed in the light reflection surface 116 is formed with one side surface like a cylinder or at least three or more side surfaces like a triangular pyramid, the light reaches only a portion of the recess portion, although the light is incident in any direction. This is because the recess portion has a three-dimensional structure instead of a two-dimensional structure.

As a result, if a surface area of a portion by which the light is not reflected is increased, a surface area of a portion by which the light is reflected is decreased, and vice versa.

Such a principle is used in the present invention. Specifically, of the side surfaces comprising the recess portion, the surface area of the portion by which the light is not reflected is minimized, so that the surface area of the portion by which the light is reflected is maximized.

Hereinafter, there is described a method for realizing the recess portion in the light guiding plate.

First of all, the recess portion is more clearly defined.

A portion among the side surfaces of the recess portion, which the light can arrive at and be reflected by, is defined as a reflection surface. The remaining portion of the side surfaces of the recess portion, at which the light cannot arrive, is defined as a non-reflection surface.

The surface area of the reflection surface of the recess portion is maximized in order to maximize the brightness. Hereinafter, in the present invention, the recess portion in which the surface area of the reflection surface is maximized and the surface area of the non-reflection surface is minimized is defined as a brightness enhancing recess portion.

The brightness enhancing recess portion may have a groove shape or a recess shape.

Figure 4:
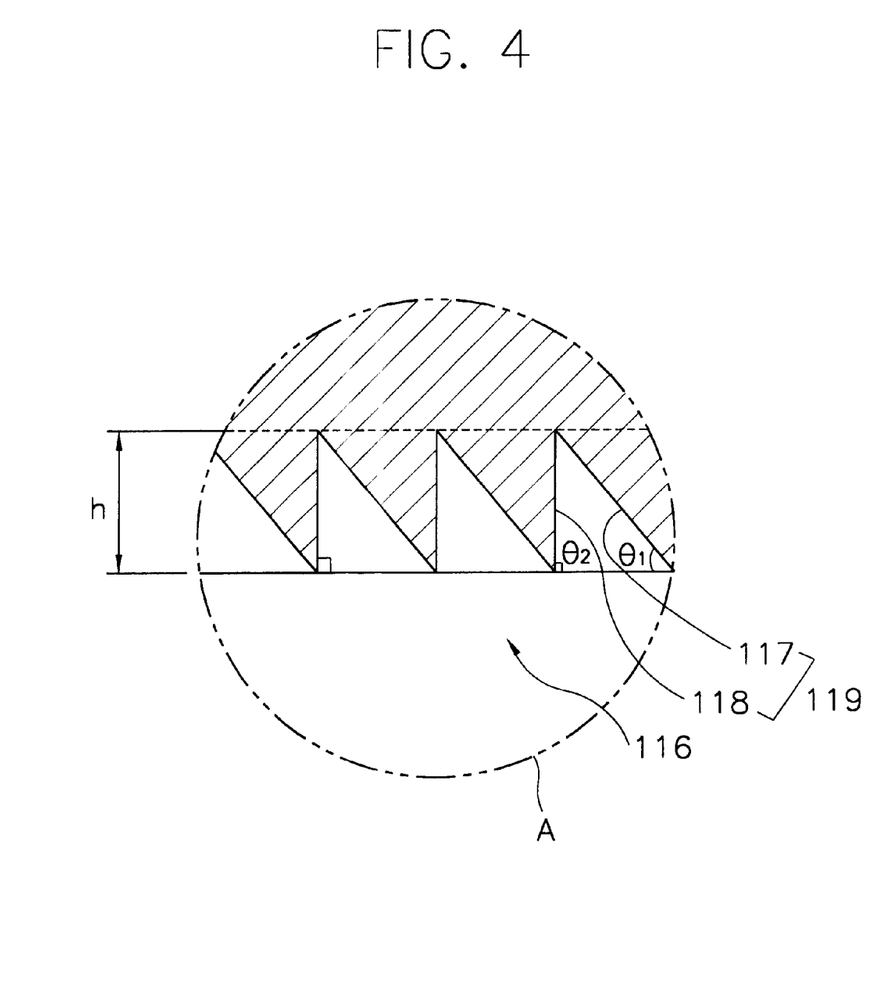
FIG. 4 is an enlarged view of a portion "A" of a brightness enhancing recess of FIG. 3.

Specifically, as shown in FIG. 4, a reflection surface 117 of the brightness enhancing recess portion has a first inclination (θ1) with respect to the light reflection surface 116.

The first inclination has a desired direction so that the light generated from the lamp 100 is incident through the light incident surface 114 of the light guiding plate 110, is reflected by the reflection surface 117, and is then directed toward the light output surface 112.

Meanwhile, a non-reflection surface 118 of a brightness enhancing recess portion 119 is extended from an end of the reflection surface 117 to the light reflection surface 116.

The non-reflection surface 118 has a second inclination (θ2) with respect to the light reflection surface 116. Since a total amount of light reflected by the reflection surface 117 is changed according to the second inclination of the non-reflection surface 118, the second inclination is very important.

Preferably, when the non-reflection surface 118 has an orthogonal angle to the light reflection surface 116, i.e., the non-reflection surface 118 has the second inclination of 90° with respect to the light reflection surface 116, the total amount of light reflected from the reflection surface 117 is maximized.

This is because, in a condition that a height h of the brightness enhancing recess portion 119 is constant, as the second inclination of the non-reflection surface 118 is smaller than an angle of 90°, the surface area occupied by one brightness enhancing recess portion 119 is increased. Thus, the number of the brightness enhancing recess portions 119 which may be formed at the light reflection surface 116 having a limited surface area is reduced. The reduction in the number of the brightness enhancing recess portion 119 means that an entire surface area of the reflection surface 117 is reduced, which means that the brightness is deteriorated.

However, when the non-reflection surface 118 of the brightness enhancing recess portion 119 is orthogonal to the light reflection surface 116, the increase in the brightness is maximized. On the contrary, although the non-reflection surface 118 is not orthogonal to the light reflection surface 116, the brightness can be increased in a certain degree.

However, in case the second inclination of the non-reflection surface 118 with respect to the light reflection surface 116 is gradually reduced and finally close to 0°, the surface area occupied by the brightness enhancing recess portion 119 is increased. As a result, the number of the brightness enhancing recess portion is decreased and thus the brightness may be reduced.

Therefore, the second inclination of the non-reflection surface 118 has to be set in an optimum range. In the present invention, the second inclination (θ2) between the non-reflection surface 118 and the light reflection surface 116 is set on the basis of the first inclination between the reflection surface 117 and the light reflection surface 116.

In other words, the second inclination (θ2) is larger than the first inclination (θ1) and limited to the angle of 90°. The first inclination is optimized so as to fully reflect the light.

For example, in case the first inclination of the reflection surface 117 is 45°, the second inclination of the non-reflection surface 118 has an angle that is larger than 45° but less than or equal to 90°.

Figure 5:
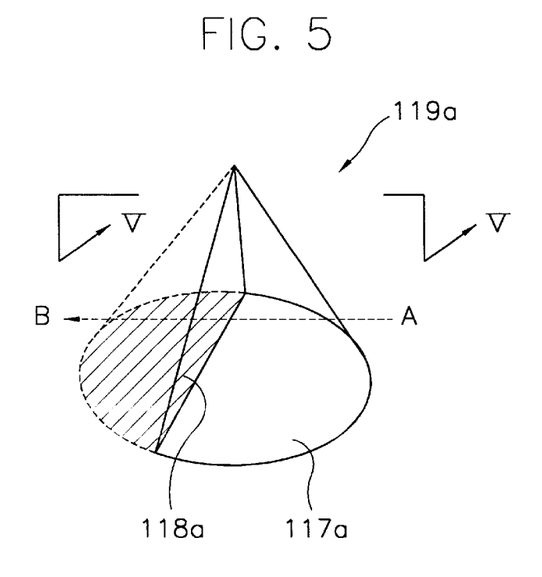
FIG. 5 is a perspective view of the brightness enhancing recess formed in the brightness-enhancing light guiding plate according to one embodiment of the present invention.
Figure 6:
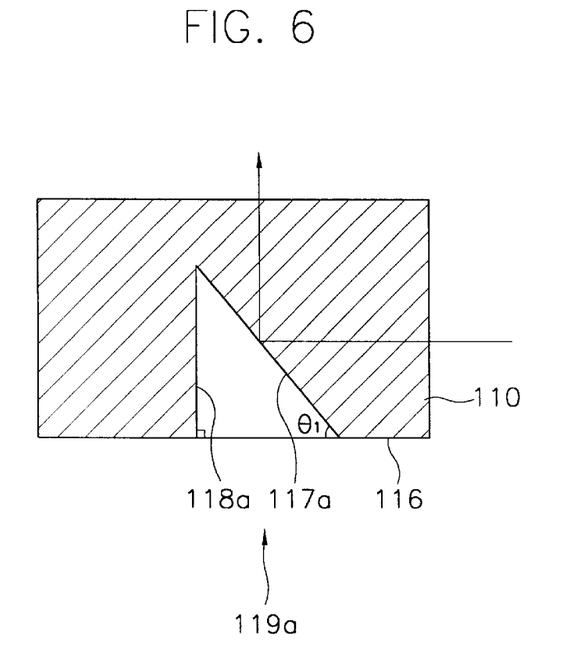
FIG. 6 is a cross-sectional view taken along the line V—V of FIG. 5.

FIGS. 5 and 6 show an example of a brightness enhancing recess portion 119a according to an embodiment of the present invention.

Referring to FIGS. 5 and 6, the brightness enhancing recess portion 119a has a semi-circular cone shape. Therefore, if the light is supplied from A toward B, the light arrives at a portion corresponding to a reference numeral 117a, but does not arrive at an oblique lined portion. As described above, the brightness enhancing recess portion 119a is divided into a reflection surface 117a and a non-reflection surface 118a according to whether the light reaches. At this time, the reflection surface 117a has a curved side surface and the non-reflection surface 117a has a plat side surface.

Then, as described above, the second inclination between the non-reflection surface 118a and the light reflection surface 116 is designed to be maximized so that only the reflection surface 117a by which the light is reflected in the semi-circular cone-shaped recess portion may remain.

As shown in FIG. 6, it is preferable that the second inclination between the non-reflection surface 118a and the light reflection surface 116 is limited to a maximum angle of 90°. At least, it is preferable that the second inclination of the non-reflection surface 118a is larger than the first inclination between the reflection surface 117a and the light reflection surface 116.

Figure 7:
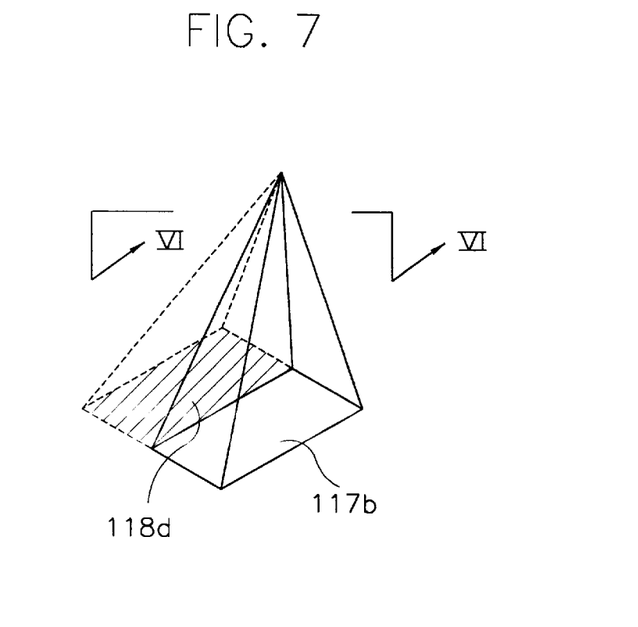
FIG. 7 is a perspective view of the brightness enhancing recess formed in the brightness-enhancing light guiding plate according to another embodiment of the present invention.
Figure 8:
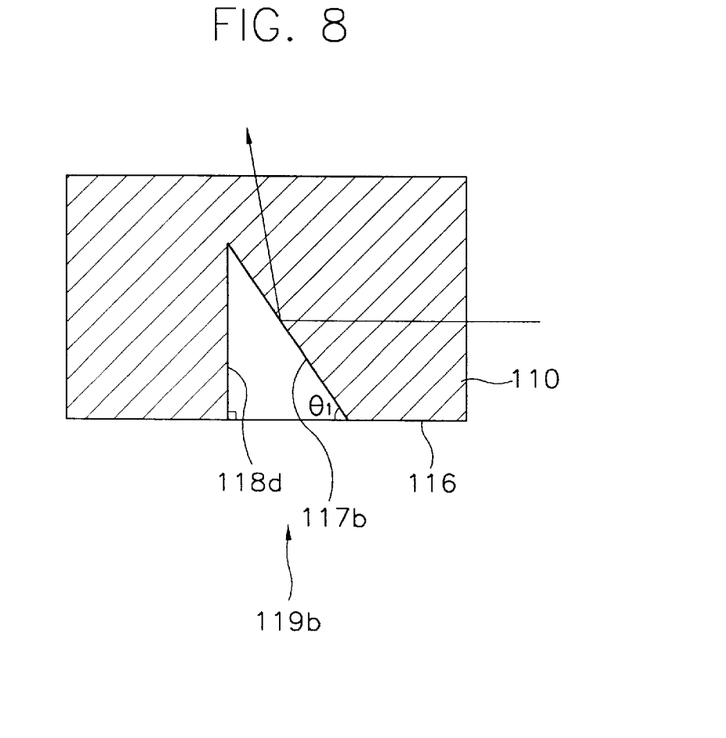
FIG. 8 is a cross-sectional view taken along the line VII—VII of FIG. 7.

However, the brightness enhancing recess portion may have a polypyramid shape as shown in FIG. 7 or FIG. 8.

Referring to FIG. 7 or 8, in the light reflection surface 116, a brightness enhancing recess portion 119b can be formed to have a quadrangular pyramid with four side surfaces and one bottom surface. Of course, the brightness enhancing recess portion 119b has a second inclination of the right angle, which is formed between a non-reflection surface 118d and a light reflection surface 116, as described above. In other words, the second inclination is 90°. Further, the second inclination is larger than a first inclination (θ1) between a reflection surface 117b and the light reflection surface 116.

Figure 9:
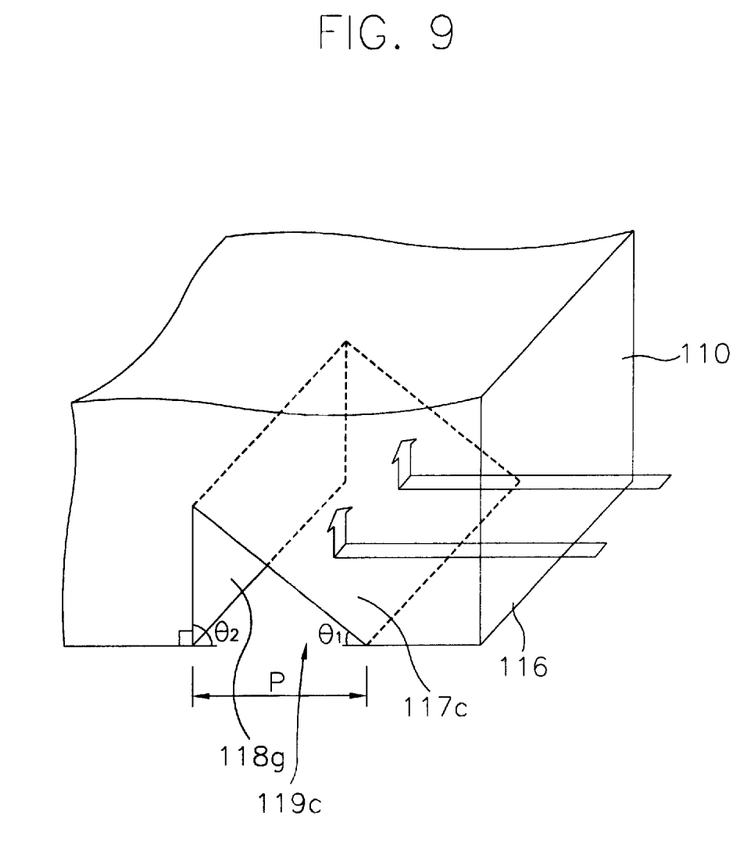
FIG. 9 is the brightness enhancing recess formed in the brightness-enhancing light guiding plate according to another embodiment of the present invention.

Further, the brightness enhancing recess portion may have various modified embodiments. For example, as shown in FIG. 9, a brightness enhancing recess portion 119c may be formed with a groove-shaped reflection surface 117c having a first inclination (θ1) with respect to a light reflection surface 116 and a groove-shaped non-reflection surface 118g having a second inclination (θ2) with respect to the light reflection surface 116.

The second inclination of the non-reflection surface is adapted to be larger than the first inclination but to be limited to the right angle with respect to the light reflection surface 116. Therefore, the number of the brightness enhancing recess portions 119c is maximized and a surface area of the reflection surface 117c is also maximized, thereby improving displaying performance.

As described above, although the brightness enhancing recess portion may have any shape, the recess portion has to be finally divided into the reflection surface and the non-reflection surface. As a result, the brightness enhancing recess portion having a groove shape, which is formed at the light reflection surface of the light guiding plate 110, can enhance the brightness by controlling the inclination of the non-reflection surface, even though the shape of the recess portion is different.

Figure 10:
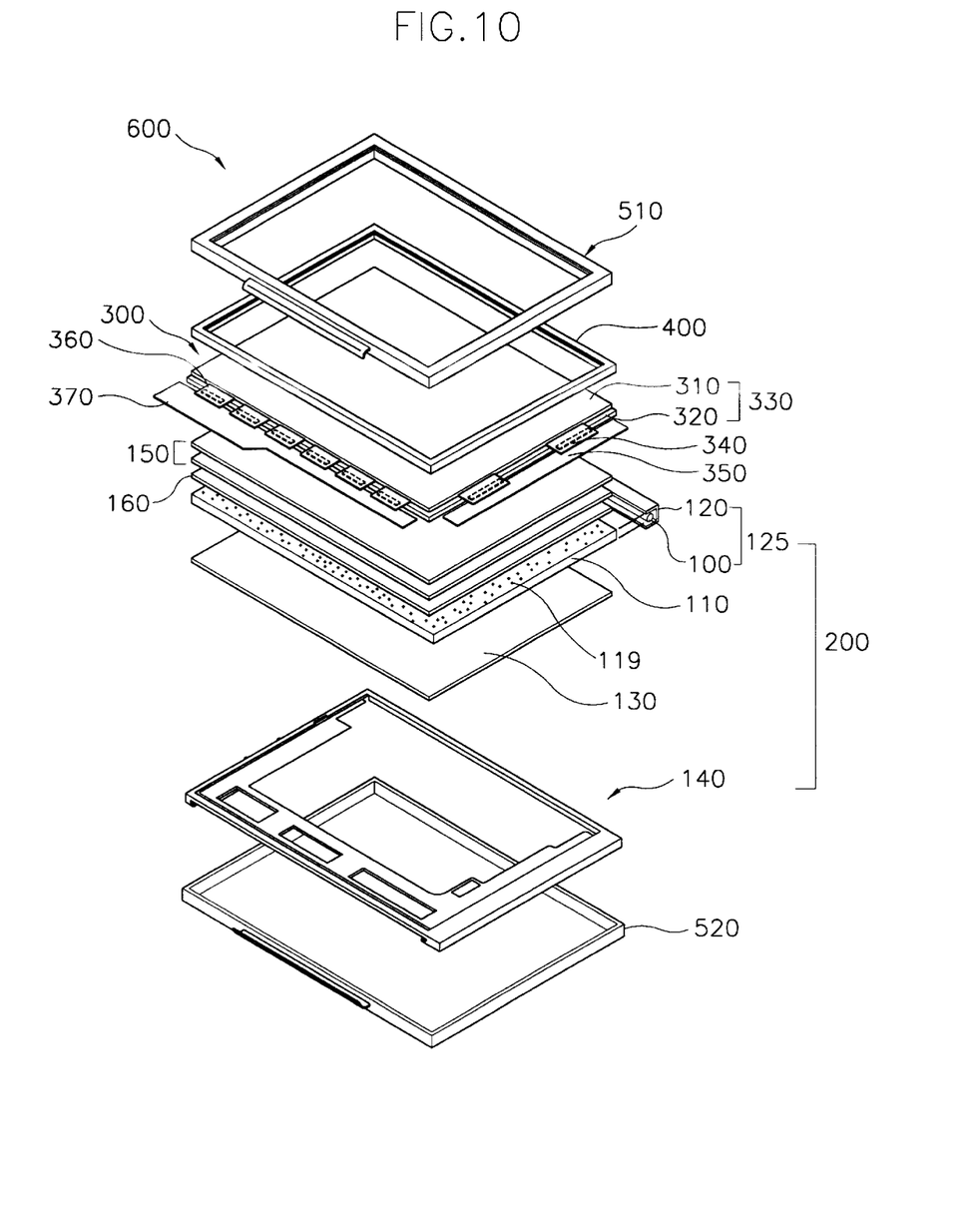
FIG. 10 is an exploded perspective view of an LCD using the brightness-enhancing light guiding plate according to one embodiment of the present invention.

Meanwhile, FIG. 10 is an exploded perspective view of an LCD in which a brightness enhancing recess portion is applied according to one embodiment of the present invention.

An LCD 600 of FIG. 10 precisely controls liquid crystal to display an image.

In other words, the liquid crystal molecules respectively having an elongate bar shape have a physical characteristic of both of crystal and liquid, an optical characteristic that a transmittance changes according to an alignment position and an electrical characteristic that the alignment position can be controlled according to an applied electric field.

In order to control the liquid crystal having the aforementioned physical, electrical and optical characteristics to display the image, the LCD 600 comprises an LCD panel assembly 300, a backlight assembly 200, a case 510, 520 and a chassis 400.

The LCD panel assembly 300 includes an LCD panel 330 for separately controlling a liquid crystal layer having a thickness of few nm in minute surface area unit, and a driving module 340, 350, 360, 370 for applying electric signals to the LCD panel 330 at a predetermined time.

In order to control the liquid crystal in the minute surface area unit, a very small power control unit and a transparent electrode are necessary.

The power control unit having the very small size can be realized by using a thin film transistor. The transparent electrode can be realized by using an Indium Tin-Oxide (ITO) thin film of oxide film series.

Specifically, on a transparent substrate, vary small thin film transistors are formed in a matrix configuration by a semiconductor thin film process. Gate electrodes of the thin film transistors included in each row of the thin film transistors are commonly connected by a gate line.

In addition, source electrodes of the thin film transistors included in each column are commonly connected by a data line. The data lines are crossed by the gate lines. However, they are not shorted each other.

In drain electrodes of the thin film transistors, pixel electrodes are formed of the aforementioned indium-tin-oxide material in a desired surface area.

As described above, the data line, the gate line, the thin film transistor and the indium-tin-oxide thin film are formed on a glass substrate. Hereinafter, the glass substrate is defined as a TFT substrate 320. The data line and the gate line are connected to a driving module for applying a signal to operate the thin film transistor. Thus, a desired intensity of power is applied to each pixel electrode.

As an example, a color filter substrate 310 is aligned with and coupled to the TFT substrate 320. The TFT substrate 320 and the color filter substrate 310 are assembled to form the LCD panel 330.

The color filter substrate 310 comprises an RGB pixel having the same pattern as that of the pixel electrode formed on the TFT substrate 320, and a common electrode that is formed on an upper surface of the RGB pixel so that reference power is always applied thereto. Of course, the RGB pixel and the common electrode are formed on the transparent substrate.

Then, the liquid crystal (not shown) is injected between the color filter substrate 310 and the TFT substrate 320 to form the LCD panel assembly 300.

Hereinafter, a method for driving the LCD panel assembly 300 is described.

Firstly, in a status that the driving module sequentially applies a predetermined power to a first data line to a last data line, the driving module applies turn-on power to the first gate line. Therefore, all of the thin film transistors connected to the first gate line is turned on. The power applied to the data lines is applied to the pixel electrode.

If power level is changed in the pixel electrode, an electric field is formed between the common electrode and the pixel electrode. Therefore, the alignment of the liquid crystal between the common electrode and the pixel electrode is changed.

The above processes are repeatedly performed from the first gate line to the last gate line, thereby forming an image for a very short time. Therefore, this is continuously repeated, thereby displaying a still image or a moving image.

However, it is difficult to normally display the image with only the LCD panel assembly, since the liquid crystal cannot generate a light by itself. Therefore, in order to normally perform the displaying operation in the LCD, the light is needed.

It is important to precisely control the liquid crystal in the LCD panel assembly 300. It is also important to generate the light necessary to perform the displaying operation. If an optical distribution of the light necessary to perform the displaying operation is non-uniform, it is impossible to normally perform the displaying operation, even though the LCD panel assembly 300 has excellent performance.

The aforementioned backlight assembly performs such an important function of generating the light.

The backlight assembly 200 includes a lamp assembly 125 and the light guiding plate 110. In addition, the backlight assembly 200 may further include a plurality of optical sheets 150, 160 and 130 for realizing an optimal optical distribution, and a receiving container 140.

Since the displaying operation is performed in surface unit in the LCD panel assembly 300, brightness of a light source has to be secured to be uniform over an entire surface area of the LCD panel.

However, except the sunlight, it is difficult to realize the light source having the optical distribution of a surface light source. Even though it is possible to realize the light source having the optical distribution of the surface light source, there is a problem of a volume and weight thereof. Therefore, a point light source like a light emitting diode (LED) or a linear light source like a Cold Cathode Fluorescent Lamp (CCFL) is used.

However, in the linear light source or the point light source, there is a problem that the shorter a distance from the light source is, the higher the brightness is and the longer the distance from the light source is, the lower the brightness is. Further, when the linear light source or the point light source is directly disposed under the LCD panel assembly, there is another problem that the volume thereof is remarkably increased.

In order to overcome the above problems, the lamp assembly 125 is not disposed right under the LCD panel assembly 300 but adjacent to a side portion of the LCD panel assembly 300. For example, the lamp assembly 125 includes a lamp 100 such as the CCFL and a reflector 120 for outputting the light, which is radially generated from the lamp 100, in only one direction.

In order to overcome non-uniformity of the brightness of the lamp assembly 125, the reflector 120 of the lamp assembly 125 is connected with the light guiding plate 110.

The light guiding plate 110 is fabricated to have a wedge shape or a flat plate shape. As an example, the light guiding plate 110 may have a rectangular parallelepiped shape, as shown in FIG. 2.

Figure 3:
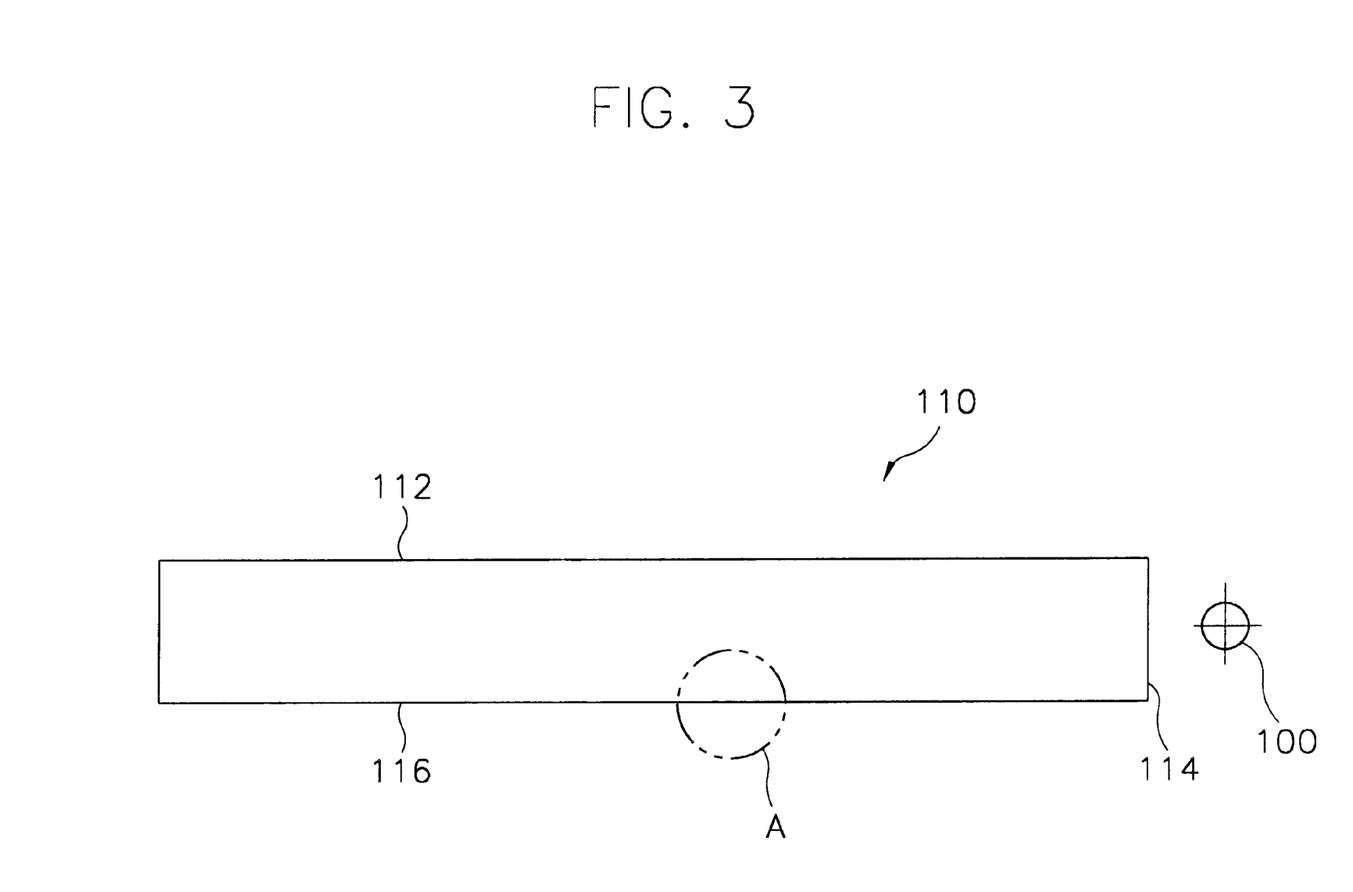
FIG. 3 is a side view of the brightness-enhancing light guiding plate according to one embodiment of the present invention.

As described above, the light guiding plate 110 functions to make a uniform brightness of the light generated from the lamp 100 and to change the direction of the light toward the LCD panel assembly 300. Further, it is preferable that the light guiding plate 110 supplies the light generated from the lamp 100 to the LCD panel (330, refer to FIG. 3) without light loss so as to improve the brightness in the LCD panel 330.

In order to uniformalize and improve the brightness, for example, the light guiding plate 110 is formed with a brightness enhancing recess portion, as shown in FIG. 4.

In other words, one of four side surfaces of the light guiding plate 110, which faces the lamp 100, is defined as a light incident surface 114. One of an upper surface and a lower surface of the light guiding plate 110, by which the light is reflected, is defined as a light reflection surface 116. The other surface through which the light is output is defined as a light output surface 112. As shown in FIG. 4, in the light reflection surface, a plurality of brightness enhancing recess portions 119 is formed.

The plurality of brightness enhancing recess portions functions to reflect the light again, and has a reflection surface 117 having a first inclination (θ1) with respect to the light reflection surface 116, and a non-reflection surface 118 having a second inclination (θ2) and extended from an end of the reflection surface 117.

the larger a total surface area of all the reflection surfaces 117 is, the more the brightness of an LCD 600 is improved.

In order to maximize the surface area of the reflection surface 117, assuming that a height h of the brightness enhancing recess portion is constant, at least, the second inclination of the non-reflection surface 118 is larger than the first inclination. Preferably, the second inclination has a right angle, thereby increasing the number of the brightness enhancing recess portions 119 and the surface area of the brightness enhancing recess portion 119 and thus improving the brightness.

The brightness enhancing recess portion 119 may have a circular cone shape which is partially cut away, as shown in FIG. 5 or 6, a polypyramid shape which is partially cut away, as shown in FIG. 7 or 8, or a groove shape having a sawtooth-shaped section. Further, the brightness enhancing recess portion 119 may have various shapes.

Even though the brightness enhancing recess portion 119 has various modified shapes, the second inclination of the non-reflection surface 118 has to satisfy the aforementioned condition, i.e., at least, the second inclination of the non-reflection surface 118 has to be larger than the first inclination. Preferably, the second inclination has a right angle, thereby increasing the brightness.

Of course, the first inclination of the reflection surface 117 has to be selected, so that the surface area is maximized.

A reference numeral 160 represents a diffusing plate for changing the optical distribution of the light which is reflected by the brightness enhancing recess portion 119 of the light guiding plate 110 and then outputted to the light output surface 112. A reference numeral 150 is a prism sheet which is formed on an upper surface of the diffusing plate 160 to change a path of the light diffused by the diffusing plate 160. A reference numeral 130 is a reflection plate for regenerating the light which is not reflected by the light reflection surface 116 of the light guiding plate 110 and is leaked to an outside of the light refection surface 116.

According to the present invention, as described above, the light distribution is uniformly controlled and the direction of the light is properly changed. Further, the brightness enhancing recess portion is formed at the light reflection surface of the light guiding plate, thereby performing a displaying operation with the maximum brightness and thus improving a displaying performance. In addition, when the brightness is improved, there is an additional effect that power consumption of the LCD used as a display device of a portable information processing apparatus is remarkably reduced.

While the present invention has been described in detail, it should be understood that various changes, substitutions and alterations could be made hereto without departing from the spirit and scope of the invention as defined by the appended claims.

What is claimed is:

1. A brightness-enhancing light guiding plate, comprising:
   a light incident surface through which a light is incident;
   a bottom surface arranged adjacent to the light incident surface, for reflecting the light; and
   a light output surface opposite the bottom surface and through which the light is output;
   wherein the bottom surface includes a plurality of a brightness-enhancing recesses, each of the brightness-enhancing recesses has a reflection recess surface which faces the light incident surface with a first inclination with respect to the bottom surface and reflects the light toward the light output surface, and a non-reflection recess surface which is extended from an end of the reflection recess surface with a second inclination with respect to the bottom surface, and
   the second inclination of the non-reflection recess surface is determined such that the number of the brightness-enhancing recesses is maximized in the bottom surface.

2. The brightness-enhancing light guiding plate of claim 1, wherein the reflection recess surface and the non-reflection recess surface are alternatively disposed on the bottom surface.

3. The brightness-enhancing light guiding plate of claim 1, wherein the second inclination is an angle of 90°.

4. The brightness-enhancing light guiding plate of claim 1, wherein each of the brightness-enhancing recesses of the bottom surface has a polypyramid shape.

5. The brightness-enhancing light guiding plate of claim 4, wherein the non-reflection recess surface of each of the brightness-enhancing recesses is parallel with the light incident surface.

6. The brightness-enhancing light guiding plate of claim 1, wherein each of the brightness-enhancing recesses of the bottom surface has a semi-circular cone shape.

7. The brightness enhancing light guiding plate of claim 6, wherein the reflection recess surface has a curved side surface and the non-reflection recess surface has a plat side surface.

8. The brightness-enhancing light guiding plate of claim 1, wherein each of the brightness-enhancing recesses of the bottom surface has a groove shape.

9. The brightness-enhancing guiding plate of claim 1, wherein the second inclination of the non-reflection recess surface is greater than the first inclination of the reflection recess surface.

10. A liquid crystal display comprising:
    a backlight assembly including: a brightness-enhancing light guiding plate having a light incident surface through which a light is incident, a bottom surface arranged adjacent to the light incident surface, for reflecting the light, and a light output surface opposite the bottom surface and through which the light is outputted, wherein the bottom surface has a plurality of brightness-enhancing recesses, each of the brightness-enhancing recesses has a reflection recess surface which faces the light incident surface with a first inclination with respect to the bottom surface and reflects the light toward the light output surface, and a non-reflection recess surface which is extended from an end of the reflection recess surface with a second inclination with respect to the bottom surface, and the second inclination of the non-reflection recess surface is determined such that the number of the brightness-enhancing recesses is maximized in the bottom surface; and an optical distribution changing means for making uniform an optical distribution of the light output from the brightness-enhancing light guiding plate; and an LCD panel assembly for controlling an amount of the light generated from the backlight assembly to display an image.

11. The liquid crystal display of claim 10, wherein the reflection recess surface and the non-reflection recess surface are alternatively disposed on the bottom surface.

12. The liquid crystal display of claim 10, wherein the second inclination is an angle of 90°.

13. The liquid crystal display of claim 10, wherein each of the brightness-enhancing recesses of the bottom surface has a polypyramid shape.

14. The liquid crystal display of claim 13, wherein the non-reflection recess surface of each of the brightness-enhancing recesses is parallel with the light incident surface.

15. The liquid crystal display of claim 10, wherein each of the brightness-enhancing recesses of the bottom surface has a semi-circular cone shape.

16. The liquid crystal display of claim 10, wherein each of the brightness-enhancing recesses of the bottom surface has a groove shape.

17. The liquid crystal display of claim 10, wherein the second inclination of the non-reflection recess surface is greater than the first inclination of the reflection recess surface.

18. A brightness-enhancing light guiding plate, comprising:

a light incident surface through which a light is incident;

a bottom surface arranged adjacent to the light incident surface, for reflecting the light;

a light output surface opposite the bottom surface and through which the light is output; and a brightness-enhancing portion including a plurality of recesses, each of the recesses having a reflection recess surface which faces the light incident surface with a first inclination with respect to the bottom surface and reflects the light toward the light output surface, and a non-reflection recess surface which is extended from an end of the reflection recess surface with a second inclination with respect to the bottom surface, wherein each of the recesses has a polypyramid shape or a semi-circular cone shape.

19. The brightness-enhancing light guiding plate of claim 18, wherein each of the recesses has the polypyramid shape, the non-reflection recess surface of each of the recesses is parallel with the light incident surface.

20. The brightness-enhancing light guiding plate of claim 18, wherein each of the recesses has the semi-circular cone shape, the reflection recess surface of each of the recesses has a curved side surface and the non-reflection recess surface of each of the recesses has a plat side surface.

* * * * *